April 9, 1929.   F. PIDEL   1,708,397
SPOTTING AND SIGHTING DEVICE FOR ANTIAIRCRAFT GUNS
Filed Nov. 27, 1925

INVENTOR
Frank Pidel,
BY
ATTORNEY.

Patented Apr. 9, 1929.

1,708,397

UNITED STATES PATENT OFFICE.

FRANK PIDEL, OF YONKERS, NEW YORK.

SPOTTING AND SIGHTING DEVICE FOR ANTIAIRCRAFT GUNS.

Application filed November 27, 1925. Serial No. 71,611.

This invention relates to a sighting appliance for guns and the like, and particularly for anti-aircraft guns.

Pursuant to my invention, the sighting appliance such as for a gun of the anti-aircraft type, comprises a suitable form of projector for projecting a substantially circular beam of light, the projector being further provided with a vertically extending strip of metal or other opaque material for "dividing" the beam substantially in two equally lighted portions separated by the shadow produced by such opaque strip. The projector is mounted on a substantially horizontal axis and suitable means are provided for rotating the projector on its horizontal axis, and preferably calibrated to indicate the angle of the center of the beam relative to the horizon. The mounting means for the projector is supported on the gun in fixed relation thereto, whereby upon bodily moving the combined gun and the projector to bring the enemy aircraft in sight, the angle between the center line of the bore of the gun and the center line of the projected beam is determined from the calibrations or otherwise pursuant to the well-known methods, and enabling the gun to be set at the determined position for firing at the aircraft.

Further features and objects of the invention will be more fully understood from the following detail description and the accompanying drawings, in which Fig. 1 is a perspective view of an anti-aircraft gun provided with my invention and illustrating the use of the same in locating and sighting an enemy airplane;

Figure 1:
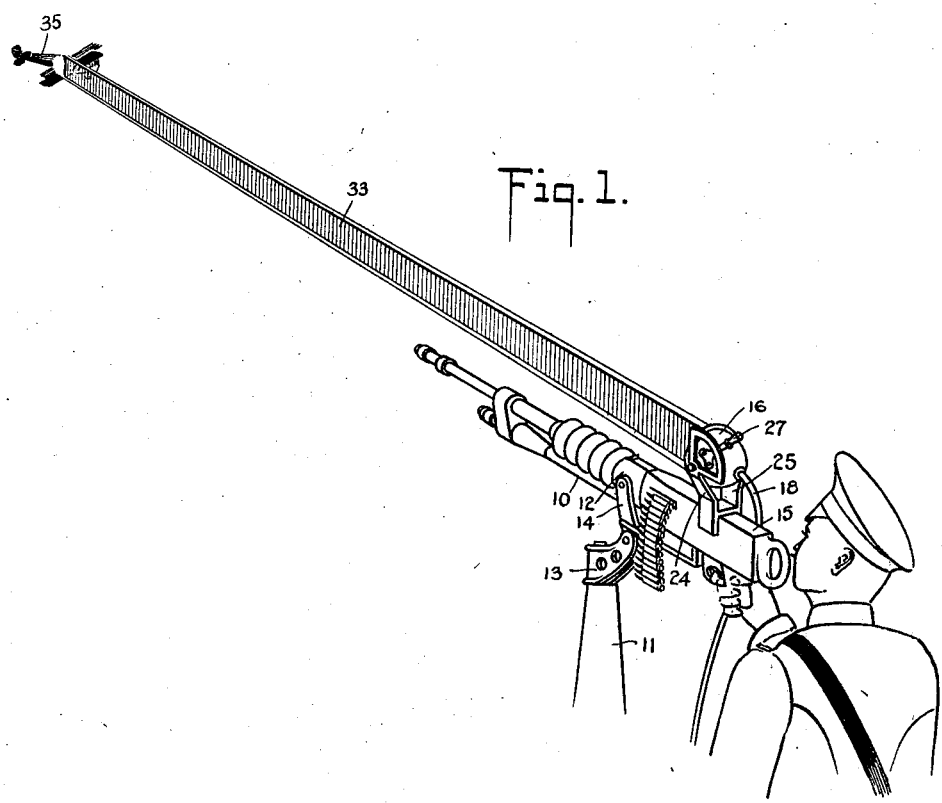

Referring to Fig. 1, the gun 10 is of any approved form and is preferably of the type of guns known as an anti-aircraft gun, which usually embodies the vertically extending standard 11. The frame 12 of the gun is mounted as usual for horizontal setting by suitable means, including the collar 13, and for vertical setting by means of the yoke member 14. In the form of the gun illustrated in Fig. 1, the barrel 15 is indicated of rectangular cross-section, but it is understood that the barrel as well as the particular structure of the remainder of the gun may be selected as preferred.

Figures 2, 4:
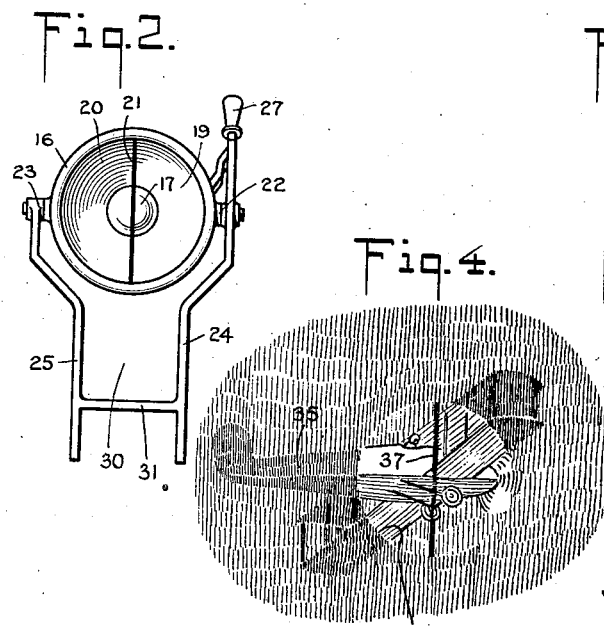
Fig. 2 is a detail front elevation, on an enlarged scale, of the light projector means, indicated in Fig. 1.
Fig. 4 illustrates, on an enlarged scale relative to that of Fig. 1, the nature of the lighting and shadow projected on the enemy airplane.
Figure 3:
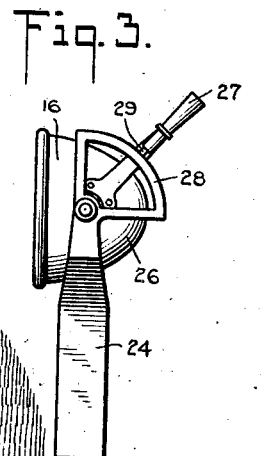
Fig. 3 is a side elevation of Fig. 2.

In suitable adjacency to the rear end of the barrel 15 of the gun, I locate the lamp projector 16, see Figs. 2 and 3, the lighting medium of which may be an incandescent lamp 17 energized by suitable electrical current transmitted through the cable 18. The reflector 19 of the projector 16 may be of the parabolic form or of any other approved form. The exterior opening 20 of the projector 16 may be closed by a lens or by plain glass serving as a suitable transparent enclosure.

I provide the strip 21 of metal or like opaque material extending substantially diametrically across the frontal opening 20 of the projector 16 and I position the strip 21 in a vertical plane for all settings of the projector 16 about its horizontal mounting, as set forth more fully hereinafter.

The mounting for the projector 16 may comprise the oppositely disposed trunnions 22, 23 formed in the oppositely disposed arms 24, 25, the lower ends of which are secured by riveting or the like to the barrel 15 of the gun. To the outer shell 26, see Fig. 3, of the projector 16 I attach at a suitable location the arm 27 for manually manipulating the setting of the projector 16, and I locate the range of radial movement of the arm 27 adjacent the sextant 28 which is provided with suitable goniometrical graduations. The arm 27 is preferably provided with the spring press pawl 29 adapted to engage any one of a set of notches or their equivalents disposed on the arc-shaped face of the sextant 28 which is engaged by the pawl 29, thereby enabling the arm 27 and therewith the projector 16 to be held at any desired position and to be reset from any position by the application of slight force to overcome the spring of the pawl 29. The sextant 28 may be mounted at the upper ends of one of the arms of the mounting of the projector 16, as for example, the arm 24.

It will be observed that the mounting for the projector 16 provides for the clearance indicated at 30 between the casing 26 and the top of the barrel 15 of the gun 10 which is free from obstruction excepting for a transverse arm 31, which may be employed if desired to brace the vertical arms 24, 25;
such clearance 30 enables the operator of the gun to obtain a line of sight above the gun when "spotting" an enemy airplane. When the enemy aircraft has been "spotted," the angle of elevation of the aircraft is determined by the angle given by the reading of the goniometrical indication of the sextant 28 and the angle of elevation of the bore of the gun 10 read from its goniometric scale. The direction of the extension of the bore of anti-aircraft gun, and likewise of the enemy aircraft, relative to the points the compass is determined by the horizontal goniometrical scale of the gun.

In the case of firing at the enemy aircraft from the determinations derived by the use of a single gun embodying my invention, the distance of the aircraft from the gun will require estimation, and upon the determination of the distance factor, proper correction of the vertical goniometrical setting of the gun for the trajectory of the shot is then made and the handle 27 of the projector 16 is grasped to reset the beam of light accordingly relative to the aircraft, whereupon the gun is in position for firing, due correction being made for drift and for the advance of the aircraft during the period of flight of a shot.

Such procedure is indicated in Fig. 1, the main light beam from the projector 16 being indicated by the parallelly hatched line 33 and the enemy aircraft at 35. Fig. 4 shows on an enlarged scale the illumination effected by the beam 33 of the projector on the enemy aircraft 35, the main or parabolic beam of light being encompassed within the substantially circular line or indication 36 and the "shadow" caused by the centering strip 21 being indicated at 37. The partial illumination of the aircraft and its surroundings indicated in Fig. 4, is effected by the stray beams of the projector, the extent of which is controlled in the design of the reflector of the projector and of the lens, if employed.

The "shadow" 37 enables the operator of the gun to observe with certainty the locating of the main light beam 33 of the projector 16 relative to the dimension presented to the view of the operator of the aircraft 35 or other object forming the target when "spotting" the target, and also to "sight" the main beam at any desired position in advance or in retardation of the target for deriving the desired "readings" of the target and for setting the gun when firing the shot.

When two or more guns embodying my sighting appliance are employed, the height of travel and the location of the enemy aircraft or other target at any instant or instants is determined without estimating by triangulation or other suitable procedure from the "readings" of the respective sighting appliances and the known spacing of locations of the guns.

As illustrated in the drawings, my sighting appliance is carried by the gun at a suitable position rearwardly of the horizontal axis about which the gun is settable, and vertically above the bore of the gun, thereby affording full conveniences of operation of my sighting appliance and for the full range of setting of the gun about its horizontal axis.

Whereas, I have described my invention by reference to specific forms thereof, it will be understood that many changes and modifications may be made without departing from the spirit of the invention.

I claim:

1. The combination of a gun having means for setting the same about a horizontal axis, a lamp, a source of light disposed in said lamp, means for rotating said lamp about a horizontal axis for projecting rays of light upon a target, said rotating means being carried by said gun at substantially the rear end of said gun and rearwardly of said setting means, calibrated means for setting said lamp at any desired rotated position, and shadow producing means carried by said lamp and disposed in the path of the light waves emitted by said source of light.

2. The combination of a gun having means for setting the same about a horizontal axis, a lamp, a source of light disposed in said lamp, means for rotating said lamp about a horizontal axis for projecting rays of light upon a target, said rotating means being carried by said gun at substantially the rear end of said gun and rearwardly of said setting means, means for setting said lamp at any desired rotated position, said setting means including a calibrated member, and a substantially vertically disposed strip of opaque material carried by said lamp and disposed in the path of the light waves emitted by said source of light.

In testimony whereof I have signed this specification this 5th day of November, 1925.

FRANK PIDEL.